United States Patent [19]

Ladin et al.

[11] 4,019,784
[45] Apr. 26, 1977

[54] HIGH-IMPACT CAPACITY BAIL BEARING ASSEMBLY

[75] Inventors: Eli M. Ladin, Ann Arbor, Mich.; Paul D. Green, Shelbyville, Ind.

[73] Assignee: Federal-Mogul Corporation, Southfield, Mich.

[22] Filed: Nov. 12, 1973

[21] Appl. No.: 414,803

[52] U.S. Cl. .............................. 308/6 R; 308/196; 308/204; 187/95; 187/9 E
[51] Int. Cl.$^2$ .................................. F16C 17/00
[58] Field of Search .......... 308/196, 204, 6 R, 3.8; 295/44; 187/9 E, 95

[56] References Cited
UNITED STATES PATENTS

| 832,427 | 10/1906 | Sisson | 308/196 |
|---|---|---|---|
| 1,232,367 | 7/1917 | Montine | 295/44 |
| 1,737,228 | 11/1929 | Exton | 295/44 |
| 2,595,120 | 4/1952 | Barnes | 187/9 E |
| 2,935,357 | 5/1960 | Sutowshi | 308/196 |
| 3,358,791 | 12/1967 | Goodacre | 187/9 E |
| 3,405,979 | 10/1968 | Lode | 308/6 R |
| 3,492,711 | 2/1970 | Fraunberg | 308/196 |
| 3,546,762 | 12/1970 | Martin | 308/196 |
| 3,586,396 | 6/1971 | Barr | 308/6 R |
| 3,672,737 | 6/1972 | Jacob | 308/196 |
| 3,697,119 | 10/1972 | Lambertus | 295/44 |

FOREIGN PATENTS OR APPLICATIONS

| 113,563 | 3/1945 | Germany | 308/196 |
|---|---|---|---|
| 103,270 | 2/1924 | Germany | 308/196 |

*Primary Examiner*—Ronald H. Lazarus
*Attorney, Agent, or Firm*—Harness, Dickey & Pierce

[57] ABSTRACT

A new, high-impact capacity bearing for rotatively supporting a load for rotation about the bearing axis. The bearing comprises inner and outer members having respective inner and outer raceways shaped so that each provides a multi-point contact with the bearing elements which travel in the raceways. A novel wheel construction incorporating the bearing assembly is also disclosed. This construction provides reduce impact loading on the bearing assembly thereby increasing the load and impact capacity of the wheel construction. The wheel construction is admirably suited for use in the lift of a fork lift truck.

6 Claims, 6 Drawing Figures

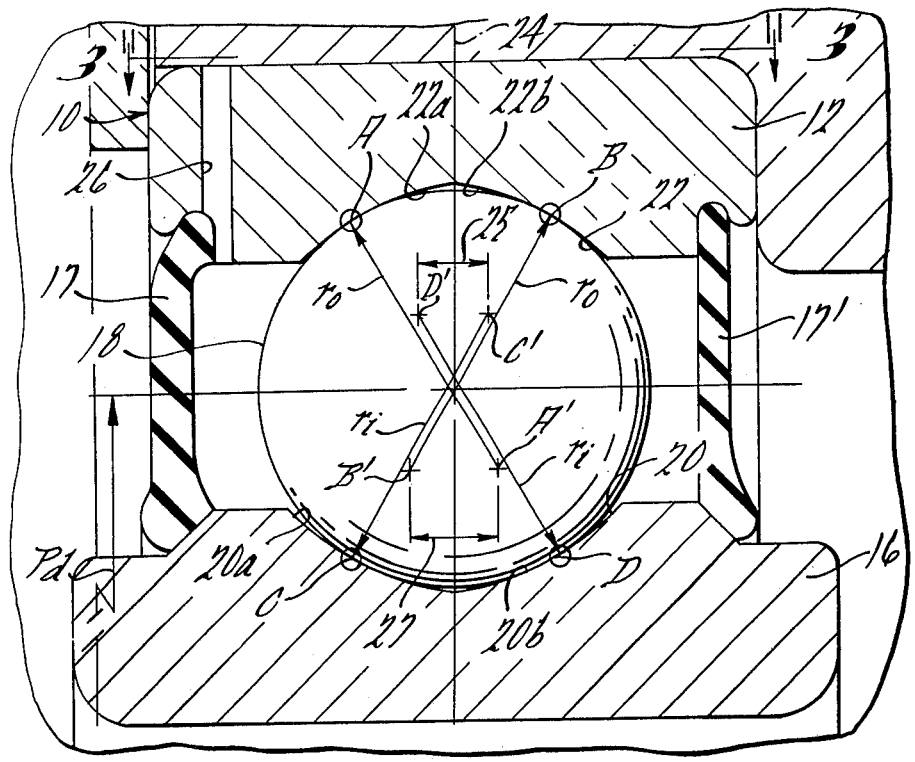
FIG. 2.
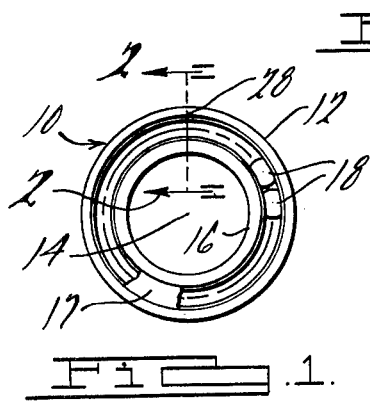
FIG. 1.
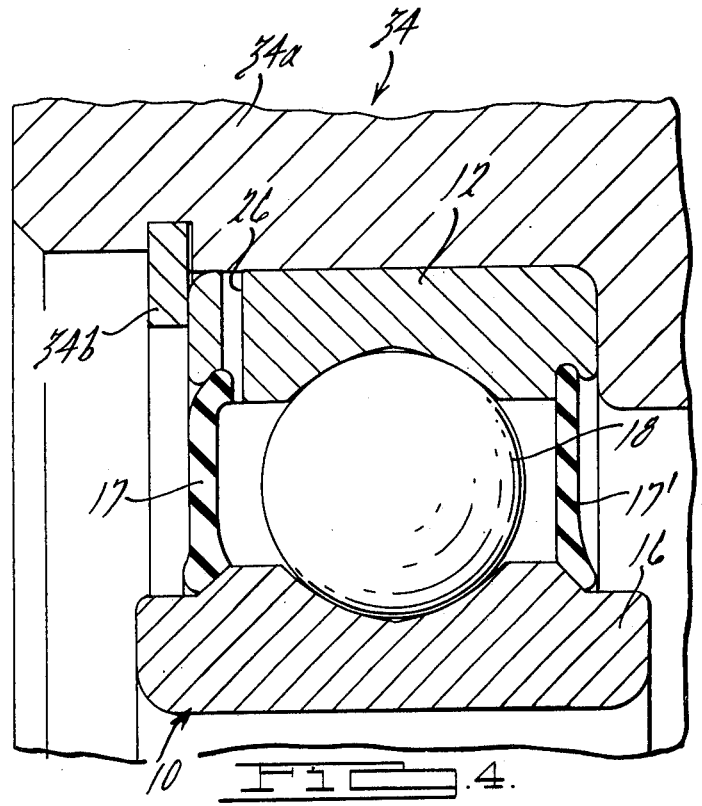
FIG. 3.
FIG. 4.

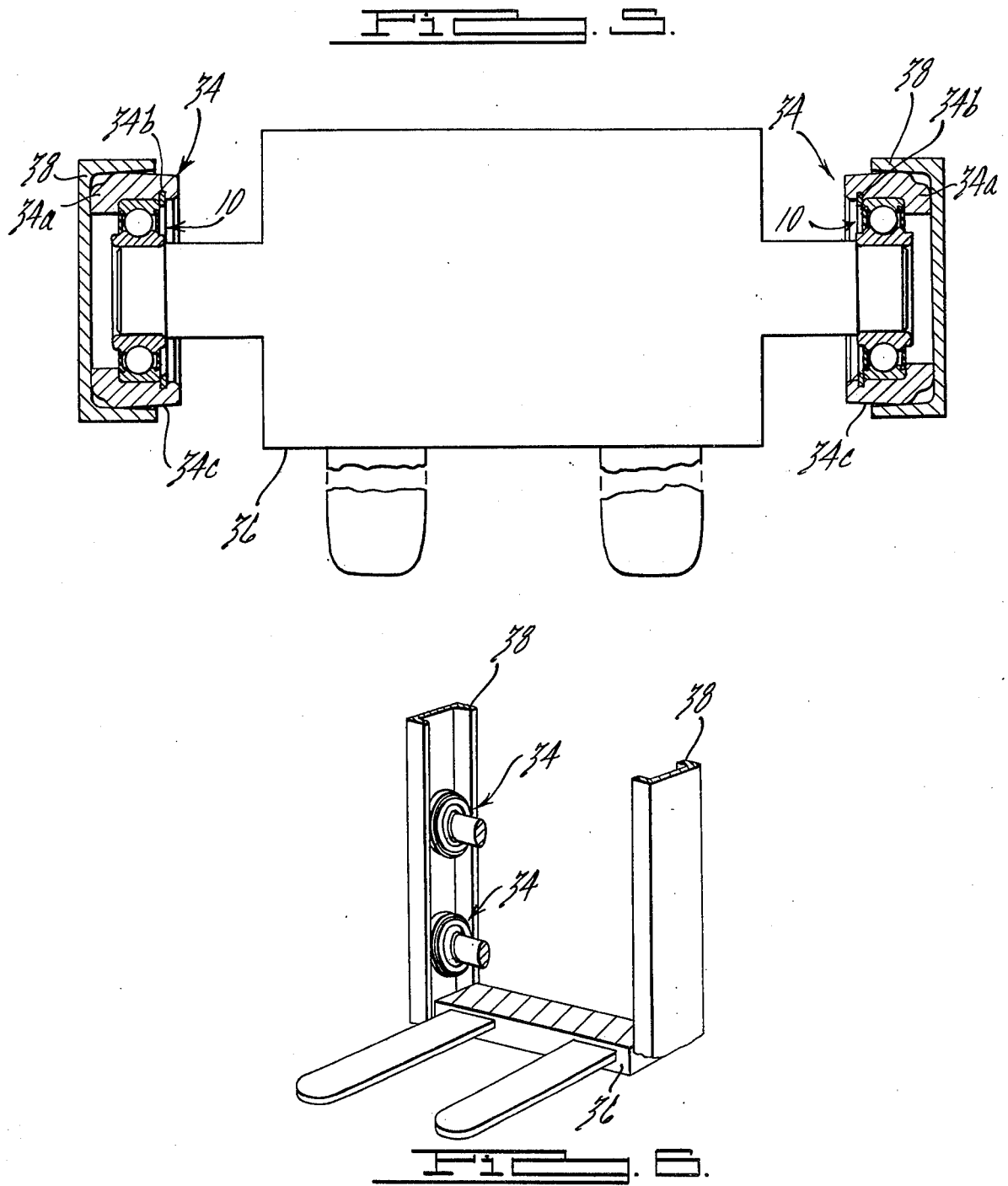

HIGH-IMPACT CAPACITY BALL BEARING ASSEMBLY

BACKGROUND AND SUMMARY OF THE INVENTION

The present invention relates to bearings of the type adapted to rotatively support a load for rotation about the bearing axis and in particular to an improved bearing assembly made in accordance with a novel method disclosed herein and claimed in co-pending application of the same inventors filed concurrently herewith and entitled "Method of Making a Ball Bearing Assembly" now U.S. Pat. No. 3,858,288.

Two prior art patents which disclose methods of making a bearing assembly are U.S. Pat. No. 822,723 and U.S. Pat. No. 2,702,216. In the former patent the bearing balls are assembled into the bearing with the inner race member eccentrically oriented relative to the outer race member. After the bearing balls have been so assembled the inner race member is made concentric with the outer race member while the balls are distributed circumferentially around and between the two members and riding in the raceways thereof. The bearing balls are customarily caged. One problem with this arrangement is that a full complement of bearing balls cannot be assembled into the bearing. In the latter patent the outer race member is split by what is termed either a crack line or a split line. A full complement of bearing balls is assembled into the bearing by first separating the ends of the outer race member at the split line to thereby temporarily circumferentially expand the outer race member. The balls are then assembled into the bearing after which the outer race member is released. The outer race member returns it to its initial shape, thereby constraining the bearings between the raceways of the inner and outer race members. The method of the latter patent provides an axial groove in the outer surface of outer race member which facilitates the formation of the split line. Thus, in the finished bearing assembly according to U.S. Pat. No. 2,702,216, an axial groove exists in the outer surface of the outer race member.

It is also known to provide a radial passage in the outer race member through which lubricant can be introduced into the bearing assembly. As will be seen in the within-detailed description, the present invention provides a bearing having a split line through the outer race member which intercepts a radial passage extending through the member. The radial passage facilitates creation of the split line in the initially circumferentially continuous outer race member.

Heretofore, bearings of the type to which the present invention relates have proved unsatisfactory when used in applications where relatively high-impact loads are repeatedly encountered. This is the case for the wheel bearings used in guiding the lift of a fork lift truck where presently used bearings are only marginal in performance. One solution to the problem, of course, is to replace the bearings of the type shown in U.S. Pat. No. 822,723 with others of the same type, but larger, having a higher load rating. However, such a solution is undesirable since it means that due to the increase in bearing size, the entire bearing assembly, including related portions of the lift construction will be larger and result in increased cost. On the other hand, it has been found that bearings of the type shown in U.S. Pat. No. 2,702,216 have chips, spalls and other surface imperfections formed at the raceway along the crack line as a result of the methods described therein for causing the crack.

Among the objects of the present invention are to provide an improved, high-impact capacity bearing which: lasts longer than prior bearings used for high-impact applications, yet is of comparable size and weight; is easier to manufacture and assemble; can be manufactured economically; contains a full complement of bearing elements; and in other respects achieves important advantages over prior bearings.

When utilized in connection with the lift of a fork lift truck the present invention also provides an improved bearing and wheel construction which: is more durable, more shock-resistant, and can last longer than prior constructions.

The foregoing objects, as well as additional objects, advantages and benefits of the invention will be seen in the ensuing description and claims which are to be taken in conjunction with the accompanying drawings.

BRIEF DESCRIPTION OF THE DRAWINGS

The drawings illustrate a preferred embodiment of the invention in accordance with the best mode presently contemplated for carrying out the invention.

FIG. 1 is an axial end view of a bearing according to the present invention.

FIG. 2 is an enlarged, sectional view taken in the direction of arrows 2—2 in FIG. 1.

FIG. 3 is a reduced fragmentary view taken in the direction of arrows 3—3 in FIG. 2.

FIG. 4 is a sectional view similar to FIG. 2 illustrating the bearing mounted on a wheel of the lift of a fork lift truck.

FIG. 5 is a generally horizontal sectional view illustrating the wheel construction of the lift of the fork lift truck.

FIG. 6 is a perspective view of the construction of FIG. 5.

DESCRIPTION OF THE PREFERRED EMBODIMENT

In FIGS. 1, 2, and 3, a bearing 10 according to the present invention comprises an annular outer race member 12 disposed concentrically around the axis 14 of the bearing, an annular inner race member 16 coaxial with and circumferentially encompassed by outer race member 12, and a plurality of identical spheroidal bearing balls 18 constrained between the two race members. Inner race member 16 comprises a radially outwardly facing annular raceway 20 extending around the outside thereof, and outer member 12 a radially inwardly facing annular raceway 22 extending around the inside thereof.

In axial cross section as shown in FIG. 2, each raceway 20 and 22 has a two-point contact with each bearing ball 18, the points of contact being indicated at A, B, C, and D, respectively. Each raceway 20 and 22 comprises a pair of annular intersecting surfaces. These surfaces are designated 20a and 20b for raceway 20, and 22a and 22b for raceway 22. In axial cross section, surfaces 20a and 22a lie on one side of an imaginary radial line 24 (FIG. 1) through the center of the ball 18, while surfaces 20b and 22b lie on the other side of line 24. In order to provide a two-point contact of each bearing ball 18 with raceway 20, each surface 20a and 20b is provided with a radius of curvature which exceeds the radius of the bearing ball 18. For example, each surface 20a and 20b may be provided with the same radius of curvature (designated $r_i$). The center of curvature for surface 20a (designated C') is located radially outwardly beyond the bearing pitch diameter (designated $P_d$) and on the opposite side of line 24 from surface 20a; the center of curvature for surface 20b (designated D') is located radially outwardly beyond pitch diameter $P_d$ and on the opposite side of line 24 from surface 20b. Similarly, in order to provide the two-point contact of each bearing ball 18 with raceway 22, surfaces 22a and 22b are provided with a radius of curvature which exceeds the radius of the bearing ball 18. For example, each surface 22a and 22b may be provided with the same radius of curvature (designated $r_o$). The center of curvature for surface 22a (designated A') is located radially inwardly of bearing pitch diameter $P_d$ and on the opposite side of line 24 from surface 22a; the center of curvature for surface 22b (designated B') is located radially inwardly of bearing pitch diameter $P_d$ and on the opposite side of line 24 from surface 22a. Thus, each bearing ball 18 has a two-point contact with each raceway with each point of contact being on opposite sides of line 24. It will be observed that while the bearing construction is symmetrical about line 24, the construction need not necessarily be symmetrical in axial cross section about the center of each bearing ball 18. For example, note that the distance between points C' and D' (designated by the numeral 25) is somewhat less than the distance between points A' and B' (designated by the numeral 27). The illustrated construction is particularly advantageous, for the load points A, B, C, and D result in the load being distributed in a pressure ellipse at each load point. By providing two-point contact with each raceway, the impact capability of the bearing can be significantly increased without increasing the size of the bearing. This is particularly advantageous in applications subjected to high-impact loads as described earlier. It will also be noted that bearing 10 contains a full complement of bearing balls 18 which is beneficial to its load carrying characteristics. Preferably, annular seals 17 and 17' are disposed on opposite sides of the assembly to keep contaminants away from the raceways and balls. Also the bearing is preferably lubricated by suitable lubricant. While the particular two-point contact bearing feature described above in detail is considered of particular significance, any multiple contact bearing is considered of advantage over the standard single contact more conventional bearings used heretofore in similar applications.

FIGS. 4-6 illustrate bearing 10 in a wheel assembly construction 34 used in the lift 36 of a fork lift truck. Lift 36 has four wheel assemblies 34, two each on opposite sides. During operation, as wheel assemblies 34 are subjected to high-impact loads, usually in the radial direction, bearings 10 can withstand these impacts and survive much longer than prior bearings. The wheel assemblies 34 on each side ride in a corresponding channel 38. (Further details of the lift mechanism have been omitted from the drawing for sake of clarity since they do not pertain to the present invention.) With the illustrated arrangement, the lift 36 is guided by channels 38 for generally vertical movement so that a load may be elevated by the forks of the lift for transport by the truck. Each wheel 34 comprises an annular wheel member 34a. Bearing 10 preferably has an interference fit within member 34a and is positively retained by means of a snap ring 34b. In accordance with a further aspect of the invention it has been found beneficial to the performance of wheel assembly 34 to make member 34a of a material having a lower hardness but greater toughness and impact resistance than the material of members 12 and 16. For example member 34a could be ductile iron and members 12 and 16 could be of hardened steel but it would be advisable for the hardened steel of member 34a to be of lower hardness and greater toughness and impact resistance than the hardened steel of members 12 and 16. Also, member 34a could be of other materials, or combinations thereof, such as laminated rubber or other non-metallics and steel, to provide the required toughness and impact-resistance properties. In this way, high impact loads on the wheel assembly are cushioned by the shock-absorbing effect of this particular construction; this reduces wear and tear on bearing 10. A slightly loose fit can be provided between the channels 38 and the outer periphery 34c of wheel assemblies 34 to permit lift 36 to travel freely vertically up and down within the guideways without undue restriction. Thus in applications where high impact load is encountered a more durable, more shock-resistant, and longer-lived construction is provided.

While any method of splitting race member 12 so as to be able to increase the number of balls within the raceway would be generally acceptable, the preferred method as described in detail and claimed in the above-mentioned U.S. Pat. No. 3,858,288, is briefly stated below. Outer member 12 is initially a solid, circumferentially continuous ring. A radial passage 26 in the form of a small, thin circular bore is provided through outer race member 12 adjacent one axial end of bearing 10. Outer race member 12 is then split by applying a uniform load on the outer surface of race member 12 along the horizontal axis of the race member which load line intersects the radial passage 26 and is depicted in FIGS. 2 and 3 as crack or split line 28. It has been found that the provision of passage 26 facilitates the formation of crack line 28 and substantially reduces the number of scrap pieces heretofore generated by splitting solid outer rings lacking passage 26. The crack is cleaner through the race member and eliminates chipping and other related imperfections at the points where the crack 28 intersects raceway 22. The crack line 28 thus formed is generally parallel to a plane passing through axis 14 and intercepts passage 26. A full complement of bearing balls 18 is readily assembled into bearing 10 by moving the ends of members 12 at crack line 28 apart. The bearing balls 18 are introduced between the separated ends of member 12 into raceways 20 and 22. When a full complement of bearings has been assembled, member 12 is returned to its initial shape. The completed bearing 10 is illustrated in FIG. 1. The bearings may be caged or not, as desired.

It is to be understood that the foregoing description is that of a preferred embodiment of the invention. Various changes and modifications may be made without departing from the spirit and scope of the invention as defined by the appended claims.

We claim:

1. In a fork lift vehicle lifting mechanism, the combination including upright guide channels, a lift member mounted for guided movement along said guide channels, and a plurality of wheel assemblies rotatably mounted on said lift member and disposed in guided engagement with said guide channels, each said wheel assembly comprising an annular wheel member and a bearing assembly concentrically mounted on the wheel member for journalling the latter for rotation about its axis, said bearing assembly comprising inner and outer race means composed of steel and a plurality of bearing elements constrained between said inner and outer race means, said annular wheel member formed with an axially extending aperture for receiving said outer race means in an interference fit for applying a preloading to said outer race means, said wheel member having physical characteristics providing greater impact resistance and toughness than either of said race means whereby the high impact loads sustained by the lifting mechanism are absorbed within the wheel member and a substantially decreased load is transferred to the bearing elements.

2. In a fork lift vehicle lifting mechanism including a lift member mounted for guided movement along upright guide channels, the improvement comprising a plurality of high impact, high load capacity anti-friction bearing wheel assemblies rotatably mounted on the lift member and disposed in guided engagement with the guide channels, each wheel assembly comprising a bearing assembly and an annular wheel member therearound, each bearing assembly comprising a steel inner race member formed with a radial outwardly facing annular raceway extending around the outside thereof and disposed coaxial with the axis of rotation of said wheel assembly, a steel outer race member circumferentially encompassing and disposed radially outwardly of said inner race member and formed with an inward facing annular raceway extending around the inside thereof coaxial with the axis of rotation of said wheel assembly, said outer race member including an axially and radially extending crack line to permit the adjacent ends thereof to be pulled apart during assembly of said bearing assembly to insert the maximum number of bearing elements between the annular raceways as permitted by the geometry thereof, a plurality of generally spheroidal anti-friction bearing elements confined between said outer and said inner race member and riding in the annular raceways thereof, each said annular raceway formed in axial cross section to provide a two-point contact with each bearing element, the points of contact of each raceway with each bearing element being at points disposed on opposite sides of an imaginary line extending through the center of said bearing element perpendicular to the axis of said bearing assembly, said annular wheel member formed with an axially extending aperture for receiving and circumferentially encompassing said outer race member in an interference fit for retaining and supporting the cracked said outer race member, said wheel member composed of a material having physical characteristics providing greater impact resistance and toughness than either of the race members whereby the impact loads sustained by the lifting mechanism are absorbed within the wheel member and a substantially decreased load is transferred to the bearing elements.

3. The bearing assembly of claim 2 wherein each raceway comprises a pair of intersecting annular bearing surfaces, thereby providing a two-point contact with each bearing element, one of the two points of contact of each bearing element with each raceway being with one of said bearing surfaces and the other point of contact being with the other bearing surface.

4. The bearing assembly of claim 3 wherein said bearing surfaces of each raceway are curved in axial cross section.

5. The bearing assembly of claim 4 wherein the bearing surfaces of the same raceway have the same radius of curvature in axial cross section.

6. The bearing assembly of claim 5 wherein the bearing surfaces of each raceway in axial cross section are symmetrical with respect to each other about an imaginary line bisecting each bearing element perpendicular to the bearing assembly axis.

UNITED STATES PATENT AND TRADEMARK OFFICE
CERTIFICATE OF CORRECTION

PATENT NO. : 4,019,784
DATED : 4-26-77
INVENTOR(S) : Eli M. Ladin, et al

It is certified that error appears in the above-identified patent and that said Letters Patent are hereby corrected as shown below:

On Abstract page, in the Title of Invention delete "Bail" and insert --Ball--; under Foreign Patents or Applications delete "Germany" (both occurrences) and insert therefor --Swedish-- and --Swiss-- respectively; Column 1, in the Title of Invention, delete "Bail" and insert --Ball--

Signed and Sealed this

Twenty-seventh Day of December 1977

[SEAL]

Attest:

RUTH C. MASON
Attesting Officer

LUTRELLE F. PARKER
Acting Commissioner of Patents and Trademarks